_3,468,984_
_Patented Sept. 23, 1969_

---

3,468,984
O-2,4-DICHLORO-4-IODOPHENYL(THIO) PHOSPHATES AND (THIO) PHOSPHONATES
Ernst Beriger, Allschwil, Switzerland, assignor to Ciba Limited, Basel, Switzerland, a Swiss company
No Drawing. Filed Nov. 16, 1965, Ser. No. 508,157
Claims priority, application Switzerland, Nov. 20, 1964, 14,977/64
Int. Cl. C07f 9/18, 9/40; A01n 9/36
U.S. Cl. 260—964     3 Claims

ABSTRACT OF THE DISCLOSURE

Phosphoric and phosphonic acid esters are provided which are represented by the formula

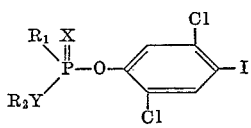

wherein $R_1$ represents lower alkyl, lower alkoxy or lower alkylthio, lower halogenoalkyl or aryl, $R_2$ denotes methyl or ethyl, and X and Y independently of one another represent oxygen or sulphur.

The phosphoric and phosphonic acid esters of this invention are useful as insecticides, fungicides, acaricides, nematocides and molluscicides.

---

The present invention relates to new aromatic phosphoric or phosphonic acid esters of general formula

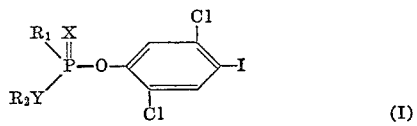

in which $R_1$ represents a low alkyl, alkoxy or alkylthio group, a low halogenoalkyl group or an aryl group, $R_2$ denotes methyl or ethyl, and X and Y independently of one another denote oxygen or sulphur atoms.

The phosphoric or phosphonic acid esters defined by Formula I have insecticidal, fungicidal, acaricidal, nematocidal and molluscicidal properties.

In the formula given above, $R_1$ may represent an alkoxy or alkylthio group; such groups are for example: methoxy, methylthio, ethoxy, ethylthio, propoxy, propylthio, isopropoxy and isopropylthio.

In the formula given above $R_1$ may, according to the definition, further represent a low alkyl group, for example, methyl, ethyl or isopropyl. Furthermore $R_1$ may, according to the definition, denote a halogenoalkyl group, for example, halogenomethyl such as chloromethyl or bromomethyl. However, higher alkylated groups are also possible, as for example α-halogenoethyl or α-halogenopropyl groups.

According to the definition, $R_1$ may also represent an aryl group, for example phenyl or substituted phenyl, preferably halogen-substituted phenyl for example, 2,4-dichloro- or 2,4-dibromo-phenyl. The phenyl group $R_1$ may, in addition to halogen atoms, contain further substituents, for example low alkyl groups such as tert. butyl or tert. amyl groups, nitro groups or trifluoromethyl groups.

The new phosphoric or phosphonic acid esters of Formula I may be used in numerous types of pesticides.

The present invention therefore also provides pesticides in which the active substance is at least one of the phosphoric or phosphonic acid esters of Formula I of the invention, optionally with other additives for example, carriers, solvents, diluents, dispersing agents, adhesives, wetting agents, fertilisers, and under certain circumstances other pesticides.

As a result of their wide biocidal action, the new agents have the particular advantage that they may be used to combat very varied types of animal pests.

They are therefore not only suitable as insecticides but also show outstanding action against harmful microorganisms, for example, against fungi such as _Alternaria solani_, _Phytopthora infestans_ and _Septoria apii_, as well as against harmful acarides, nematodes and their eggs or larvae, when used for plant protection at a concentration which does not cause any phytotoxic phenomena. Furthermore, the new materials are generally usable as microbiocides, for example, against varieties of Aspergillus, as well as insecticides, for example, against midges and flies.

In order to produce directly sprayable solutions of compounds of general Formula I, there may be used, for example, mineral oil fractions of high to medium boiling range for example diesel oil or kerosene, coal tar oil and oils of vegetable or animal origin, as well as hydrocarbons for example, alkylated naphthalenes, tetrahydronaphthalene, optionally with the use of xylene mixtures, cyclohexanols, ketones and also chlorinated hydrocarbons for example, trichlorethane, trichlorethylene or tri- and tetrachlorobenzenes. It is advantageous to use organic solvents having a boiling point of above 100° C.

Aqueous application forms are especially advantageously prepared from emulsion concentrates, pastes or wettable spray powders, by the addition of water. As emulsifying or dispersing agents, there may be used nonionic products, for example, condensation products of aliphatic alcohols, amines or carboxylic acids having a long-chain hydrocarbon group of about 10 to 20 carbon atoms, with ethylene oxide, for example, the condensation product of octadecyl alcohol and 25 to 30 mols of ethylene oxide, or that of soya bean fatty acid and 30 mols of ethylene oxide, or that of technical grade oleylamine and 15 mols of ethylene oxide, or that of dodecylmercaptan and 12 mols of ethylene oxide. Amongst anionic emulsifying agents which may be used, one may mention: the sodium salt of the sulphate ester of dodecyl alcohol, sodium dodecylbenzene-sulphonate, the potassium or triethanolamine salt of oleic or abietic acid or of mixtures of these acids, or the sodium salt of a petroleum sulphonic acid. Cationic dispersing agents that may be used are quaternary ammonium compounds for example cetyl-pyridinium bromide, or dioxethylbenzyldodecylammonium chloride.

Talc, kadin, bentonite, calcium carbonate, and also charcoal, cork meal, wood meal and other materials of vegetable origin may be used as solid carriers for the preparation of dusting and sprinkling agents. The production of the preparations in granular form is also very useful. The various forms of application may contain, in the usual way, additives to improve the distribution, adhesion, resistance to rain or the penetrating power. As such materials there may be mentioned fatty acids, resins, glue, casein or alginates.

The materials of the invention may be used by themselves or together with conventional pesticides, especially insecticides, acaricides, nematocides, bactericides or other fungicides.

The invention further provides a process for the preparation of the new phosphoric or phosphonic acid esters of Formula I, which comprises reacting a phosphoric acid or phosphonic acid halide of formula

in which $R_1$, $R_2$, Y and X have the meanings given above, and Hal represents a halogen atom, preferably chlorine, with a metal salt, preferably the sodium salt of 2,5-dichloro-4-iodophenol.

The process may be carried out in the presence or absence of solvents; solvents which may be used are for example benzene, toluene, xylene and chlorobenzene.

Most of the esters obtainable according to the invention are oily, but some are crystalline low-melting substances. These are generally easily soluble in ethanol and acetone. The 2,5 - dichloro - 4 - iodophenol used as the starting material may be prepared as follows: 81.5 parts of 2,5 dichlorophenol are neutralised with 20.5 parts of sodium hydroxide in 1000 parts of water. A solution of 127 parts of iodine in 127 parts of potassium iodide and 500 parts of water is added dropwise to this solution during 1 hour, at 20 to 25°. The mixture is then stirred for a further 1 hour at room temperature and thereafter a solution of 100 parts of concentrated sulphuric acid in 200 parts of ice is added, 60 parts of sodium bisulphite are added to this, and the precipitated 2,5 - dichloro - 4 - iodophenol is filtered off and recrystallised from cyclohexane. 113 parts by weight of the pure compound, melting at 74° C., are obtained.

The following examples illustrate the invention:

EXAMPLE 1

28.9 parts of 2,5-dichloro - 4 - iodophenol are stirred with 16 parts of potassium carbonate and 0.5 part of copper powder in 75 parts by volume of methyl ethyl ketone. 18.9 parts of diethyl thiochlorophosphate are added dropwise to this mixture during 15 minutes, and the mix then heated to 70–80° C. for a further 8 hours. After cooling, the solid components are filtered off and the filtrate evaporated in vacuo at 50°. The residue is dissolved in 100 parts by volume of methylene chloride and washed twice with 25 parts by volume of ice-cooled caustic soda at a time. The methylene chloride solution is dried over sodium sulphate and the solvent evaporated off in vacuo at 50°. The residue obtained consists of 28 parts of the condensation product in the form of a reddish-coloured oil which solidifies to crystals after standing for a while. These melt at 47–48° C. after recrystallisation from methanol. The condensation product has the following formula

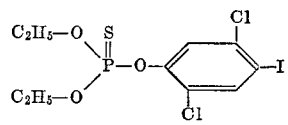

EXAMPLE 2

24 parts of 2,5 - dichloro - 4 - iodophenol are dissolved in 100 parts of water by means of 3.4 parts of sodium hydroxide. The water is removed in vacuo and the dried sodium salts dissolved in 100 parts by volume of toluene.

The solution is warmed to 70–80° and 15 parts of dimethyl thiochlorophosphate are added dropwise. The mixture is stirred for a further 8 hours at 70–80°. After cooling the salt is filtered off, and the solution successively washed with water and 1 N ice-cooled caustic soda. The solution is dried over sodium sulphate and the solvent is evaporated off in vacuo, at 50° bath temperature. The residue obtained consists of 24 parts of the condensation product in the form of a pale yellow oil.

This solidifies, after standing for a while, to crystals melting at 72 to 73°.

The condensation product has the following formula

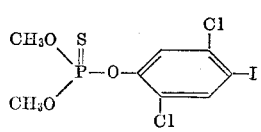

The following esters may be prepared in the same manner as that described in Examples 1 and 2:

R=2,5-dichloro-4-iodophenyl group

| | | |
|---|---|---|
| 3 | $\begin{array}{c}CH_3O\\ \phantom{CH_3O}\diagdown\phantom{O}\\ CH_3O\diagup\end{array}\!\!\!\overset{O}{\underset{}{\overset{\|}{P}}}\!\!-O-R$ | M.P., 53–55° C. |
| 4 | $\begin{array}{c}C_2H_5O\\ \phantom{C_2H_5O}\diagdown\phantom{O}\\ C_2H_5O\diagup\end{array}\!\!\!\overset{S}{\underset{}{\overset{\|}{P}}}\!\!-O-R$ | $n_D^{18}$ 1.5500 |
| 5 | $\begin{array}{c}CH_3-O\\ \phantom{CH_3-O}\diagdown\phantom{O}\\ C_2H_5-O\diagup\end{array}\!\!\!\overset{S}{\underset{}{\overset{\|}{P}}}\!\!-O-R$ | $n_D^{18}$ 1.5941 |
| 6 | $C_6H_5\!-\!\underset{\underset{OC_2H_5}{\|}}{\overset{\overset{S}{\|}}{P}}\!-O-R$ | M.P., 94–96° C. |
| 7 | $CH_3\!-\!\underset{\underset{OCH_3}{\|}}{\overset{\overset{S}{\|}}{P}}\!-O-R$ | M.P., 91–93° C. |
| 8 | $\begin{array}{c}CH_3\\ \phantom{CH_3}\diagdown\phantom{O}\\ CH_3\diagup\end{array}\!\!\!CH\!-\!\underset{\underset{OCH_3}{\|}}{\overset{\overset{S}{\|}}{P}}\!-O-R$ | M.P., 71–72° C. |

EXAMPLE 9

(Dusting powder)

2 parts of one of the active substances of Examples 1 to 8 are sprayed on to 98 parts of kaolin and the mixture obtained ground to a homogeneous dust.

EXAMPLE 10

(Wettable powder)

25 parts of one of the active substances of Examples 1 to 8 are sprayed on to 73 parts of kieselguhr and the whole mixture subsequently ground with 2 parts of naphthalenesulphonic acid to form a homogeneous mass. Water is added to this mass until the desired concentration of active substance is reached.

EXAMPLE 11

(Emulsion)

20 parts of one of the active substances of Examples 1 to 8 are dissolved in 75 parts of xylene and 5 parts of castor oil butyl ester sulphonate are added.

The solution so obtained is suspended in an amount of water such that the desired concentration of active substance is obtained.

EXAMPLE 12

The esters of Examples 1 and 2 were compared as to their bait poison effect on Prodenia, with the O,O-dimethyl thiophosphoric acid 2,5-dichloro-4-bromophenyl ester (cf. French Patent No. 1,344,586) commercially available under the generic name Bromophos. In the course of this, the following results were obtained:

| | Mortality in percent | | | | | | | | |
|---|---|---|---|---|---|---|---|---|---|
| | Bromophos | | | Example 1 | | | Example 2 | | |
| Effect after days | 1 | 2 | 4 | 1 | 2 | 4 | 1 | 2 | 4 |
| Conc. percent active substance: | | | | | | | | | |
| 0.08 | [1]100 | [1]100 | [1]100 | [1]100 | [1]100 | 100 | [1]100 | [1]100 | 100 |
| 0.04 | [1]100 | [1]100 | 80 | [1]100 | [1]100 | 100 | [1]100 | [1]100 | 100 |
| 0.02 | [1]100 | 40 | 60 | [1]100 | [1]100 | 100 | [1]100 | 60 | 100 |
| 0.01 | 40 | 40 | 40 | 60 | 80 | 100 | 80 | 80 | 100 |
| 0.005 | 0 | 40 | 40 | 20 | 20 | 40 | 40 | 40 | 40 |
| 0.0025 | 0 | 0 | 0 | 0 | 0 | 20 | 20 | 20 | 20 |

[1] New population, where 100% have been killed.

It is surprising that such an increase in effectiveness could be achieved, particularly at low concentrations, by replacing the bromine by an iodine atom; such an increase in effectiveness could not be foreseen.

EXAMPLE 13

Aphids on string beans were treated, in an open field experiment, with the compounds according to Examples 1 and 2, formulated according to Example 11. The comparison substance used was 2-isopropyl-4-methyl-pyrimidyl-6-O-O-diethyl-thiophosphoric acid ester. (Referred to as Compound V in the following examples.)

The following results were obtained:

| | | Number of aphids | |
|---|---|---|---|
| | Compound | 3 days before | 3 days after treatment |
| Amount used, in percent: | | | |
| 0.03 | Control, untreated | 850 | 890 |
| 0.03 | Example 1 | 1,080 | 0 |
| 0.03 | Example 2 | 440 | 0 |
| 0.025 | Compound V | 440 | 0 |

EXAMPLE 14

*Macrosiphon rosae* on roses were treated with the compounds of Examples 1 and 2.

| | | Number of aphids | |
|---|---|---|---|
| | Compound | 3 days before treatment | 3 days after treatment |
| Amount used, in percent: | | | |
| 0.03 | Control, untreated | 270 | 270 |
| 0.03 | Example 1 | 1,400 | 0 |
| 0.03 | Example 2 | 540 | 0 |
| 0.025 | Compound V | 320 | 0 |

EXAMPLE 15

Lavrae of *Psylla mali* on apple trees were sprayed before the trees flowered.

Amount used, in percent:     Percent attack (1–5 larvae per bud) on an average of 200 bud shoots

| Amount used, in percent: | |
|---|---|
| Untreated | 50.5 |
| 0.03% Example 1 | 0 |
| 0.03% Example 2 | 0 |
| 0.02% Compound V | 0 |

In the laboratory, Schmierläuse (*Pseudococcus citri*) on Bryophyllium were treated with the following compounds and degree of success:

| | Percent effectiveness |
|---|---|
| 0.03% Example 2 | 78 |
| 0.05% Fenitrothion | 80 |
| 0.02% Compound V | 24 |

EXAMPLE 16

Larvae in the second stage, and young females of *Aspidiotus hederae*, on Arilia were treated with the compound of Example 1 and with Parathion.

| | Percent effectiveness |
|---|---|
| 0.03% Compound 1 | 84 |
| 0.04% Parathion | 100 |

EXAMPLE 17

*Thrips tabaci* on Phlox was treated with the compounds of Examples 1 and 2 and the number of Thrips larvae and imagines per 10 stem buds at a time were determined.

| | Before treatment | After 7 days |
|---|---|---|
| Untreated | 142 | 171 |
| 0.03% Compound of Example 1 | 135 | 0 |
| 0.03% Compound of Example 2 | 212 | 0 |
| 0.025% Compound V | 100 | 0 |

EXAMPLE 18

10 May beetles at a time were dipped into a spray solution containing the active substances of Examples 1 and 2 and Parathion and were put onto untreated leaves after drying; the degree of success was determined 24 hours later.

| Amount used: | Percent mortality |
|---|---|
| Untreated | 0 |
| 0.0075% compound of Example 1 | 100 |
| 0.0075% compound of Example 2 | 100 |
| 0.005% Parathion | 100 |

In a feeding experiment on leaves which had been treated with the same spray solutions, the following mortality rates were determined after 24 hours.

| Amount used: | Percent mortality |
|---|---|
| Untreated | 0 |
| 0.015% compound of Example 1 | 100 |
| 0.015% compound of Example 2 | 100 |
| 0.01% Parathion | 100 |

EXAMPLE 19

Merlot vines were sprayed to combat the second generation of grape "wicker" and the degree of attack, in percent, determined on 3× 300 grapes.

| Amount used | Attack in percent | Effectiveness, in percent |
|---|---|---|
| Untreated | 34 | |
| 0.03% Compound of Example 1 | 6.5 | 81 |
| 0.03% Compound of Example 2 | 0.5 | 99 |
| 0.02% Parathion | 0 | 100 |

EXAMPLE 20

4× 5 larvae each of the saltmarsh caterpillar (*Estigmene acrea*) in the 3rd stage of development were dipped into the spray solutions and then placed on dried cotton leaves.

The mortality rate was determined after 48 hours.

| Amount used: | Mortality in percent |
|---|---|
| Untreated | 5 |
| 0.02% compound of Example 1 | 100 |
| 0.1% compound of Example 2 | 95 |
| 0.02% Parathion | 90 |
| 0.1% carbaryl | 60 |

EXAMPLE 21

Cabbage seedlings had 1 dl. (decilitre) of the spray solutions quoted below poured over them, and cabbage flies placed thereon. The damage and the number of caterpillars was assessed after 1 month.

| Amount used | Total number of plants | Proportion damaged | Total No. of caterpillars |
|---|---|---|---|
| Untreated | 52 | 49=94% | 51 |
| 0.03% Compound of Example 1 | 40 | 4=10% | 2 |
| 0.03% Compound of Example 2 | 48 | 5=10% | 22 |
| 0.025% Compound V | 41 | 5=12% | 1 |

EXAMPLE 22

A 0.1% acetone solution of the ester of Example 1 shows 100% contact effectiveness against *Drosophila melanogaster* both after ½ an hour and after 8 hours. The ester of Example 2 acts in the same way. The same solution was diluted to 0.01%, 0.001% and 0.0005%. At these dilutions, the contact effect on *Musca domestica* was still always 100% after 8 hours.

EXAMPLE 23

A 0.3% solution of the ester of Example 1 showed a 100% bait poison effect on *Musca domestica* after 24 hours. If this 0.3% solution is again diluted threefold and the solution so obtained once again diluted threefold, the 100% bait poisoning effect after 24 hours is still maintained.

What is claimed is:

1. The aromatic phosphoric or phosphonic acid esters of the formula

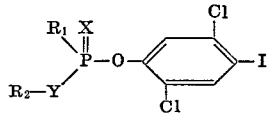

in which $R_1$ represents a member selected from the group consisting of lower alkoxy, lower alkylthio, lower alkyl, lower chloroalkyl, lower bromoalkyl, phenyl and halogen substituted phenyl wherein halogen is selected from the group consisting of chlorine and bromine, $R_2$ denotes a methyl group or an ethyl group and X and Y independently represent oxygen or sulphur.

2. The compound according to claim 1 of the formula

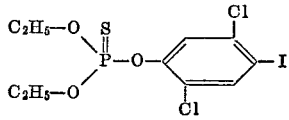

3. The compound according to claim 1 of the formula

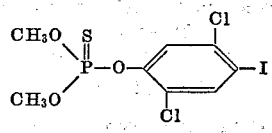

References Cited

UNITED STATES PATENTS

| | | | |
|---|---|---|---|
| 3,356,772 | 12/1967 | Buck et al. | 260—961 |
| 3,149,143 | 9/1964 | Newallis et al. | 260—961 |
| 2,599,516 | 6/1952 | Moyle | 260—964 |

FOREIGN PATENTS 956,343   4/1964   Great Britain.

CHARLES B. PARKER, Primary Examiner
ANTON H. SUTTO, Assistant Examiner

U.S. Cl. X.R.

260—955, 961, 973; 424—222, 225